May 29, 1962

W. C. CROWSON 3,036,659

LUBRICATOR

Filed May 19, 1960

Walter C. Crowson
INVENTOR.

BY A. T. Sperry
ATTORNEY

United States Patent Office 3,036,659
Patented May 29, 1962

3,036,659
LUBRICATOR
Walter C. Crowson, 2020 W. North, Tampa, Fla.
Filed May 19, 1960, Ser. No. 30,239
8 Claims. (Cl. 184—11)

This invention relates to lubricators, and is particularly concerned with a splash lubricator and drip cup adapted to be applied as a modification to a conventional injector pump and motor of current design. The specific injector pump for which the present splash lubricator and drip cup is intended is characterized by a sealed gear chamber in which engine lubricant is freely circulated and a separate pump chamber to which lubricant is separately and periodically supplied by the operator as required. While such means of lubricating the pump chamber is effective and efficient, the human element is involved in maintaining an adequate supply of lubricant for the injector section, and frequently replenishing of pump liquid is neglected, resulting in heat, wear and ultimate injury.

The present invention meets this problem by providing an automatically continuous supply of lubricant from the gear chamber to the pump chamber. In general terms, the invention involves the modification of the gear section casing to provide access therethrough to the pump casing, and in addition thereto it provides, at the opening between the gear casing and the pump section, a splash lubricator including a plate disposed through the opening and located adjacent the gears of the gear casing which gears are bathed in a continus supply of oil which is lifted with rotation of the gear and impinged against the plate to be discharged through the opening to the pump chamber. In addition thereto, a drip cup is provided below the splash plate to accuumulate oil from the gear housing and to deliver it through the pump shaft bearing to the pump chamber. In this manner a continuous adequate flow of lubricant is automatically and copiously supplied to the pump casing without the necessity of reliance upon the operator's vigilance.

From the foregoing it will be seen that a primary object of the present invention is to provide a means for delivering lubricant from a heretofore sealed gear chamber to an adjoining pump chamber thus to avoid the necessity for an independent and separate lubricating system, or requiring periodic replenishment of the isolated lubricant in the pump chamber. Numerous other features and advantages of the present invention will be apparent by consideration of the following specification, taken in conjunction with the accompanying drawings.

Figure 1:
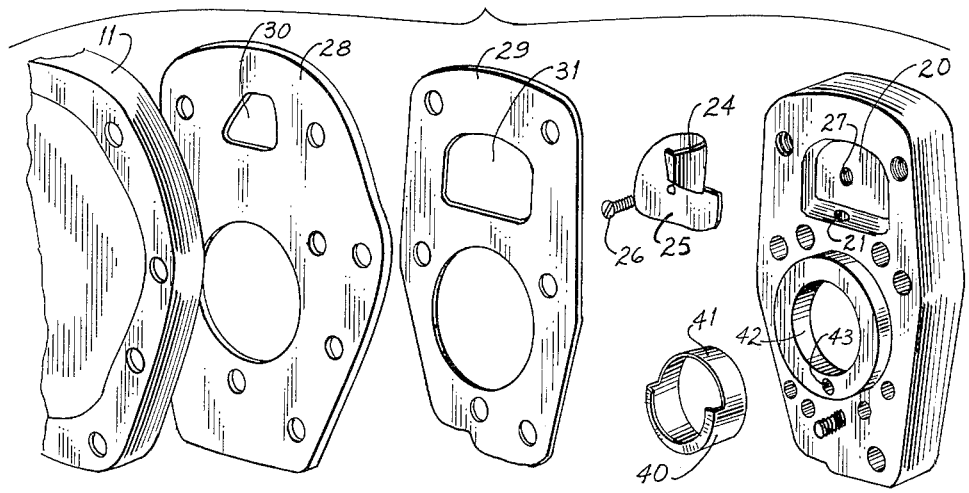
Figure 2:
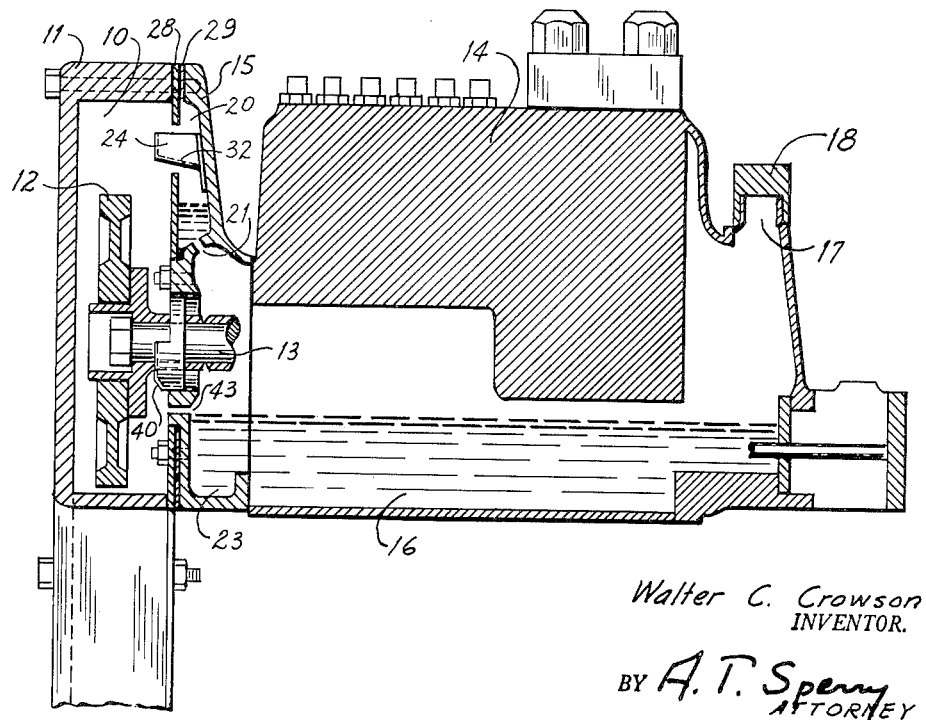

FIG. 1 is an exploded view of the parts of the modifications required for the present invention, and FIG. 2 is a longitudinal vertical section of the pump and gear housing modified in accordance with the present invention.

While certain aspects of the present inventive concept may be broadly applicable to provide novel and improved mechanisms for the lubrication systems of existing mechanisms, the present form of the invention is specifically adapted for the conversion of a present day type of motor injector pump in which, while the motor and gear chamber are lubricated through a circulating lubricating arrangement, the isolated pump chamber requires periodic filling with liquid lubricant and the operator's vigilance in maintaining such an appropriate oil level.

In the particular structure to be converted by the present form of the invention, there was provided a gear chamber indicated in FIG. 2 by the numeral 10 and formed by a gear chamber housing 11. Within this chamber gears are provided including a cam shaft drive gear 12, which rotates the cam shaft 13 of the injector pump block indicated at 14. Mounted between the housing 11 and the block 14 there is provided a pump mounting plate 15. Since the present invention is not concerned with the injector pumps themselves or their method of operation, such mechanism has not been illustrated. However, it will be understood, the injectors mounted within the block 14 are at present lubricated from a lubricating chamber 16 to which lubricant is supplied from an oil filling neck 17 normally closed by a closure cap 18.

The parts thus discussed and identified are all conventional parts of the present day structure. In this structure as now manufactured no means for delivering lubricant from the gear chamber 10 to the lubricating chamber 16 is provided, hence the operator must periodically furnish oil for the chamber 16 through the neck 17. A petcock (not shown) is provided on the sides of the chamber 16 to indicate that level of lubricant was present. From the view of the mounting plate 15 in FIG. 2, it will be noted that the present day construction provides a recess 20 in the mounting plate, but this recess provides no means for either catching oil lifted by the gear 12 and splashed therefrom, nor does it provide any access through this mounting plate to chamber 16.

Applicant's invention includes the provision of a passage 21 from the recess 20 to the hollow back chamber 23 of the mounting plate, which hollow chamber freely communicates with the chamber 16 of the pump. The invention further provides a splash lubricator in the form of a baffle or scoop 24 secured by its right-angularly related base plate 25 to the rear wall of the recess 20, securement being made by way of a securing screw 26 received in a tapped bore 27. It will be noted that the baffle scoop or oil intercepting member 24 extends forwardly from the recess to enter the gear chamber 10. To accommodate this modification a mounting plate 28 and an accompanying gasket 29 are provided for mounting between the gear chamber housing 11 and the mounting plate 15. The plate 28 is provided with a small aperture 30 through which the baffle of the splash lubricator extends and a registering but larger opening 31 is formed in the gasket 29.

With these parts in assembled relation as indicated in FIG. 2, a portion of the lubricant carried upwardly by, and splashed outwardly from, gear 12, will be intercepted by the baffle 24. The inclined lower wall 32 of the baffle delivers the oil forwardly to the recess 20. Splashed oil thus tends to fill the chamber 20 from which it is delivered through the passage 21 to the chamber 23, thence to the chamber 16 of the injector pump. Thus the injector pump chamber may be continuously and automatically supplied with lubricant without the necessity of the operator supplying such lubricant through the neck 17 and without necessity of the operator's periodic inspection of the oil level.

The invention further provides additional means for supplying the chamber 16 with oil from the chamber 10, which means consists of a semi-circular drip cup 40 extending forwardly from an annulus 41 mounted within the bearing aperture 42 for the shaft 13. The cup 40 extends forwardly into the chamber 10 from the bearing aperture to a point adjacent the forward face of the gear 12. Thus it will be seen that as oil is splashed in the chamber 10 a portion thereof will be received by the cup and will pass through the annulus 41 into the chamber 23, thence to the chamber 16 to assist in the automatic lubrication of the injector pump. In order to preclude an excess of build-up of oil in the chamber 16, the wall of the mounting plate is drilled as at 43 to provide for the return flow of lubricant from the chamber 16 to the chamber 10 and for maintaining a predetermined or level in the chamber 16.

From the foregoing, it will be seen that the present invention provides a novel, simple and improved means of lubricating an otherwise closed chamber by a splash lubricating system maintained in an adjacent chamber. More specifically the invention provides for the automatic continuous lubrication of an injector pump from the gear chamber, the gears of which rotate the injector cam shaft. While the splash baffle is here shown as being generally vertical, and provided with an inclined lower wall, it will be understood that many and various types of equivalent baffles may be used, for accomplishing the same purpose. Thus it will be understood that in the practice of the invention numerous changes, modifications and the full use of equivalents may be resorted to without departure from the spirit and scope of the invention, as outlined in the appended claims.

What I claim is:

1. Means for supplying lubricant from a first mentioned chamber in which lubricant circulates, to a second mentioned chamber, separated from the first mentioned chamber by a common wall including a lubricant baffle extending through said wall from said second mentioned chamber to said first mentioned chamber to be disposed in the path of circulation of lubricant in said first mentioned chamber and means for directing lubricant from said baffle to said second mentioned chamber, together with a drip cup in said first mentioned chamber for receiving lubricant and discharging it to said second mentioned chamber.

2. The structure as set forth in claim 1 in which the wall defines a passage for the return flow of lubricant from said second mentioned chamber to said first mentioned chamber.

3. The device as set forth in claim 2 in which the passage is independent of said baffle and said drip cup, and constituting means for restricting the level of lubricant in said second mentioned chamber.

4. The structure as set forth in claim 3 wherein a rotary shaft passes through said wall and the drip cup includes a supporting annulus surrounding such shaft.

5. An automatic lubricator for an injector pump coupled by a shaft with an external gear drive in an isolated gear chamber, wherein lubricant flows freely and is flung from a gear in rotation, which includes means mounted adjacent the periphery of said gear to intercept lubricant flung therefrom and means for delivering the intercepted lubricant to said injector pump, said first mentioned means including a drip cup in said chamber adjacent said shaft.

6. An automatic lubricator for an injector pump coupled by a shaft with an external gear drive in an isolated gear chamber, wherein lubricant flows freely and is flung from a gear in rotation, which includes means mounted adjacent the periphery of said gear to intercept lubricant flung therefrom and means for delivering the intercepted lubricant to said injector pump, said first mentioned means including a baffle extending from said pump into said chamber, and a drip cup in said chamber adjacent said shaft.

7. Means for converting a non-automatic periodically filled oil reservoir of an injector pump which is coupled by a shaft through a common wall with a gear in a gear chamber and has lubricant circulated at least in part by said gear, to automatic operation which includes an oil scoop mounted on said wall adjacent said gear to receive oil from said gear, and an oil passage from said scoop through said wall, together with an oil drip cup mounted adjacent said shaft in said chamber for discharging oil from said chamber to said pump between said shaft and said wall.

8. Means for converting a non-automatic periodically filled oil reservoir of an injector pump which is coupled by a shaft through a common wall with a gear in a gear chamber and has a lubricant circulated at least in part by said gear, to automatic operation which includes an oil scoop mounted on said wall adjacent said gear to receive oil from said gear, and an oil passage from said scoop through said wall, together with an oil drip cup mounted adjacent said shaft in said chamber for discharging oil from said chamber to said pump between said shaft and said wall, and an oil passage below said scoop and cup to permit return of oil from said pump to said chamber.

References Cited in the file of this patent

UNITED STATES PATENTS

| | | |
|---|---|---|
| 1,246,236 | Cooper | Nov. 13, 1917 |
| 1,787,428 | Fekete et al. | Jan. 6, 1931 |
| 2,143,551 | Gottlieb | Jan. 10, 1939 |
| 2,242,195 | Teker et al. | May 13, 1941 |
| 2,555,003 | Rhoads | May 29, 1951 |
| 2,882,884 | Scheiterlein | Apr. 21, 1959 |

FOREIGN PATENTS

| | | |
|---|---|---|
| 274,056 | Switzerland | July 1, 1951 |